United States Patent
Wang et al.

(10) Patent No.: US 12,273,521 B2
(45) Date of Patent: Apr. 8, 2025

(54) OBTAINING VIDEO QUALITY SCORES FROM INCONSISTENT TRAINING QUALITY SCORES

(71) Applicant: GOOGLE LLC, Mountain View, CA (US)

(72) Inventors: Yilin Wang, Sunnyvale, CA (US); Balineedu Adsumilli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 254 days.

(21) Appl. No.: 17/862,571

(22) Filed: Jul. 12, 2022

(65) Prior Publication Data
US 2024/0022726 A1    Jan. 18, 2024

(51) Int. Cl.
*H04N 19/13*    (2014.01)
*G06F 18/214*   (2023.01)
(Continued)

(52) U.S. Cl.
CPC .......... *H04N 19/13* (2014.11); *G06F 18/214* (2023.01); *G06N 20/00* (2019.01); *G06T 7/0002* (2013.01); *G06T 2207/20081* (2013.01)

(58) Field of Classification Search
CPC .. G06F 18/214; G06N 3/0455; G06N 3/0464; G06N 3/084; G06N 20/00; G06T 7/0002;
(Continued)

(56) References Cited

U.S. PATENT DOCUMENTS

| | | | |
|---|---|---|---|
| 2009/0067726 A1* | 3/2009 | Erol | G06V 30/414 382/197 |
| 2014/0169662 A1* | 6/2014 | Liu | H04N 19/59 382/218 |

(Continued)

OTHER PUBLICATIONS

Bosse et al. "A deep neural network for image quality assessment." 2016 IEEE international conference on image processing (ICIP) IEEE, 2016. (Year: 2016).*

(Continued)

*Primary Examiner* — Katrina R Fujita
(74) *Attorney, Agent, or Firm* — Young Basile Hanlon & MacFarlane, P.C.

(57) ABSTRACT

A training dataset that includes a first dataset and a second dataset is received. The first dataset includes a first subset of first videos corresponding to a first context and respective first ground truth quality scores of the first videos, and the second dataset includes a second subset of second videos corresponding to a second context and respective second ground truth quality scores of the second videos. A machine learning model is trained to predict the respective first ground truth quality scores and the respective second ground truth quality scores. Training the model includes training it to obtain a global quality score for one of the videos; and training it to map the global quality score to context-dependent predicted quality scores. The context-dependent predicted quality scores include a first context-dependent predicted quality score corresponding to the first context and a second context-dependent predicted quality score corresponding to the second context.

20 Claims, 6 Drawing Sheets

(51) Int. Cl.
*G06N 20/00* (2019.01)
*G06T 7/00* (2017.01)

(58) Field of Classification Search
CPC ........ G06T 2207/20081; G06V 10/809; G06V 10/82; H04N 19/13; H04N 19/154
See application file for complete search history.

(56) References Cited

U.S. PATENT DOCUMENTS

| | | | | |
|---|---|---|---|---|
| 2017/0076318 | A1* | 3/2017 | Goswami | G06Q 30/0276 |
| 2017/0372155 | A1* | 12/2017 | Odry | G06F 18/28 |
| 2019/0147305 | A1* | 5/2019 | Lu | G06F 18/2413 |
| | | | | 382/157 |
| 2020/0204804 | A1* | 6/2020 | Chen | H04N 19/124 |
| 2021/0089963 | A1* | 3/2021 | Baek | H04L 67/535 |
| 2022/0076078 | A1* | 3/2022 | Vdovjak | G06N 3/08 |
| 2022/0237417 | A1* | 7/2022 | Singhal | G06N 3/045 |
| 2023/0138016 | A1* | 5/2023 | Kaiser | G06N 3/04 |
| | | | | 706/21 |

OTHER PUBLICATIONS

Jiang et al. "Deep optimization model for screen content image quality assessment using neural networks." arXiv preprint arXiv:1903.00705 (2019). (Year: 2019).*

Kuzovkin et al. "Context-aware clustering and assessment of photo collections." Proceedings of the symposium on Computational Aesthetics. 2017. (Year: 2017).*

Lu et al. "Blind Surveillance Image Quality Assessment via Deep Neural Network Combined with the Visual Saliency." arXiv preprint arXiv:2206.04318 (Jun. 2022). (Year: 2022).*

* cited by examiner

OBTAINING VIDEO QUALITY SCORES FROM INCONSISTENT TRAINING QUALITY SCORES

TECHNICAL FIELD

This disclosure relates generally to video quality assessment (VQA) and more specifically to a model for VQA that is trained using inconsistent ground truth data.

BACKGROUND

A video corpus may include hundreds of millions of videos and many thousands may be added daily. Applications may be enabled using the video corpus. The applications may rely on or use respective assessed qualities of the videos in the corpus. However, manually assessing (such as by humans) the quality of the daily added videos, let alone the whole corpus, is impractical, if not impossible.

SUMMARY

A first aspect is a method that includes receiving a training dataset that includes a first dataset and a second dataset, the first dataset includes a first subset of first videos corresponding to a first context and respective first ground truth quality scores of the first videos, and the second dataset includes a second subset of second videos corresponding to a second context that is different from the first context and respective second ground truth quality scores of the second videos; training a machine learning model to predict the respective first ground truth quality scores and the respective second ground truth quality scores. Training the machine learning model includes training the machine learning model to obtain a global quality score for one of the videos of the training dataset; and training the machine learning model to map the global quality score to context-dependent predicted quality scores. The context-dependent predicted quality scores include a first context-dependent predicted quality score corresponding to the first context and a second context-dependent predicted quality score corresponding to the second context.

A second aspect is a device that includes a processor that is configured to receive an input video; obtain, from a machine learning model, a plurality of context-dependent predicted quality scores for the input video; and select one of the plurality of context-dependent predicted quality scores as a predicted quality score for the input video. To obtain the plurality of context-dependent predicted quality scores includes to obtain a global quality score for the input video; and map the global quality score to the plurality of context-dependent predicted quality scores.

A third aspect is a non-transitory computer readable medium that stores instructions operable to cause one or more processors to perform operations that include receiving an input video; obtaining, from a machine learning model, a plurality of context-dependent predicted quality scores for the input video; and selecting one of the plurality of context-dependent predicted quality scores as a predicted quality score for the input video. Obtaining the plurality of context-dependent predicted quality scores includes obtaining a global quality score for the input video; and mapping the global quality score to the plurality of context-dependent predicted quality scores.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
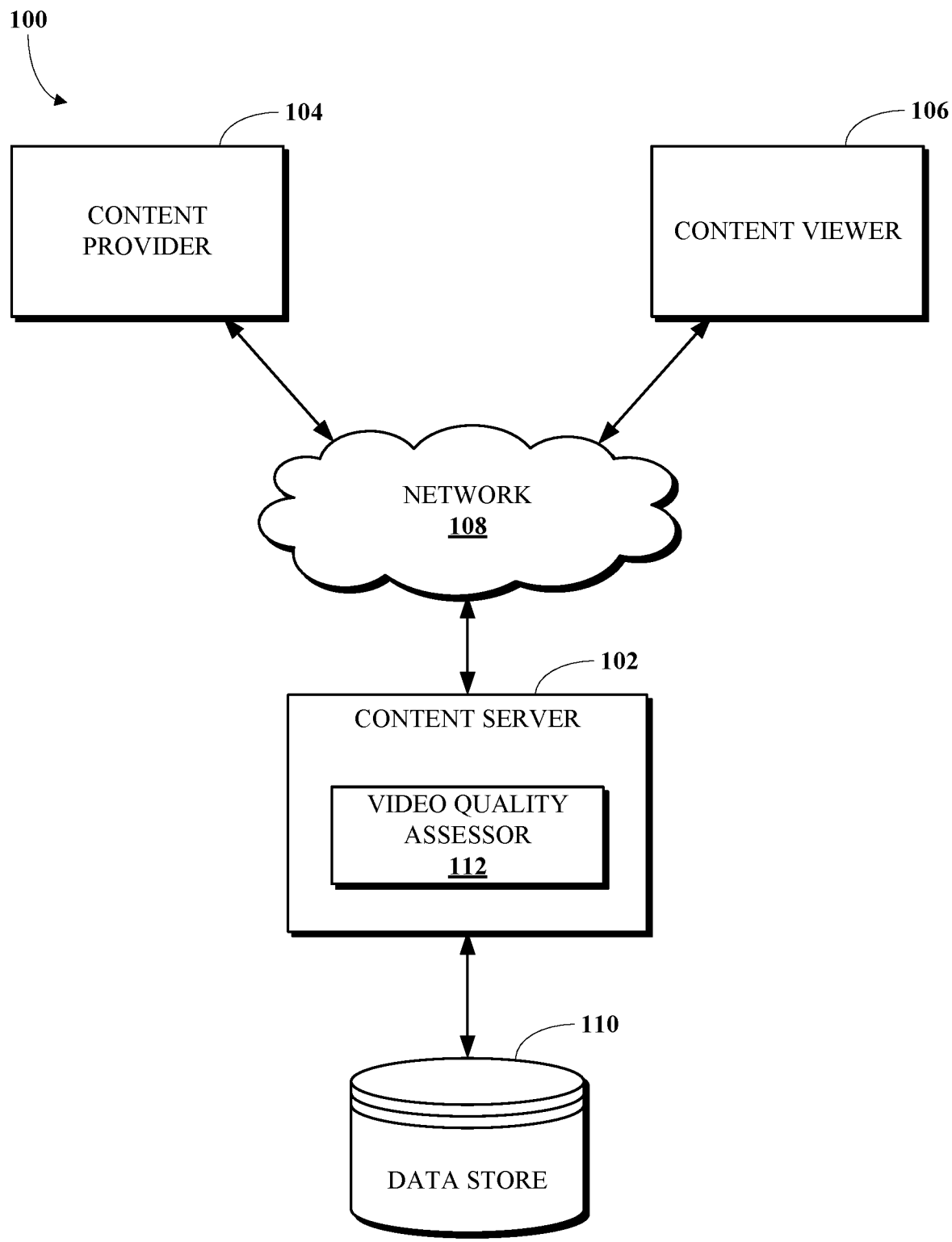
FIG. 1 is an example of an electronic computing and communications system where obtaining and using video quality scores from inconsistent training quality scores can be used.

Video quality assessment (VQA) is the process by which a quality score may be obtained for a video. A machine-learning (ML) model may be trained to obtain respective quality scores for input videos. That is, given a video, the ML model may be trained to output an approximation of a subjective quality score that may be provided by an average user (e.g., viewer) of the video. Training the ML model may include using a set of training videos and an associated set of ground truth quality scores. The ML model learns to infer (e.g., output) quality scores for input videos. The ground truth quality scores may be obtained from users (e.g., humans). For example, a set of users may view a video and provide respective subjective quality scores for the video.

A ground truth quality score for a video may be obtained from subjective quality scores, such as by averaging the respective subjective quality scores. Collecting ground truth quality scores via subjective tests may be expensive and time consuming, which in turn restricts the size of individual training datasets. A training dataset may, as a result, be small (as compared, for example, to the size of the video corpus or the daily added videos). To illustrate, the training dataset may include no more than one thousand videos.

To analyze a large video corpus (i.e., to obtain quality scores for videos therein), a practical approach may be to break down the problem into multiple contexts and conduct subjective tests separately for each of the videos of the contexts. A context can be thought of as a set of criteria that are common to the videos of a dataset of a subjective test, that relate to an environment or conditions of the subjective test, that relate to the subjects (i.e., human testers from whom the ground truth subjective quality scores are obtained) of the subjective test, other criteria, or a combination thereof. To illustrate, different VQA user tests may be conducted based on the particular needs or objectives of the VQA tests. That is, different VQA tests may be conducted to accomplish certain objectives. Test designers set up the test contexts (e.g., parameters, conditions, inputs, etc.) to meet the objectives.

Examples of contexts may include or be related to the type of videos in a particular dataset. For example, a dataset may include gaming videos, another may include music video, another may include User Generated Content (UGC) videos, and yet another may include sports-related videos. Another example of context may relate to viewing devices (e.g., Television sets, devices with large screens, portable devices, and so on). The disclosure is not limited by any type (or parameters) of contexts that may be suitable to meet the particular goals of a particular test.

Since videos of a test dataset share or meet common criteria (i.e., the context), the obtained ground truth subjective quality scores for the videos of the test dataset can be assumed to be consistent amongst themselves. Since the videos in the test dataset share a same context, it may be easy for subjects to focus on the relative differences between the videos and provide reliable and precise ratings (i.e., subjective quality scores). While it would be desirable to directly merge the quality scores collected from different subjective tests having different contexts to form a large dataset for training the ML model, such may not be possible or may lead to undesirable results or an unreliable ML model. Since existing subjective tests may be conducted for different purposes and under different conditions, the absolute scores from different datasets may have inconsistent meanings (e.g., semantics). For example, the quality scores collected could be different, could be in different scales, could have conflicts, or could have some other inconsistent meaning.

To illustrate, the objective of one test may be to obtain quality scores related to video codec performance in high end (e.g. 4K 60FPS HDR) gaming videos and the objective of a second test may simply be to collect quality scores for UGC from typical (e.g., average) users of the video corpus.

With respect to the first test, professional, details-discerning test subjects (i.e., gamers) provide quality scores for transcoded variants of the gaming videos. Such test subjects may negatively react to the smallest of distortions in the decoded test videos. Quality scores provided by gamers would most likely be relatively lower than scores provided by average, non-gamer viewers who may not be as concerned with or notice details or minor distortions. With respect to the second test, the average users may be tolerant to artefacts (e.g., distortions, shaky hands, or sub-optimal illumination) in the UGCs and may still provide high quality scores despite the artefacts.

Directly merging quality scores from different tests having different contexts, such as the first test and the second test, may negatively impact VQA ML model training. Contexts may be known at the time of conducting tests and, as such, contexts (or, equivalently, labels therefor or information associated therewith) may be available during ML-model training. However, contexts are not available at inference time (i.e., at run-time when the ML model is used to obtain quality scores for newly added videos to the corpus).

A video quality assessor according to this disclosure can overcome problems associated with multiple datasets and ground truth quality scores that may be inconsistent. The video quality assessor can handle (e.g., can be trained despite, is tolerant to) inconsistencies amongst quality scores collected in different subjective tests (e.g., having different contexts). The video quality assessor, which is an ML model, can be used to predict a single (e.g., global) quality score that the video quality assessor then maps to context-specific quality scores. The video quality assessor includes multiple mapping functions that are each trained to fit (e.g., map) the global quality score to a respective context-specific predicted quality score. As such, a global quality score can be mapped to, and the video quality assessor can output, one or more context-specific scores. Prediction accuracy (i.e., quality scores obtained) can be improved over other models that may simply merge ground truth quality scores from different datasets.

The video quality assessor described herein is tolerant to variations in data set contexts and is based on two hypotheses. The first hypothesis is that every video has a global quality score that is independent of the context in which the video was obtained. Such global quality score may considered to be a statistical result obtained from thousands or more test subjects. As such, any two videos can be compared based on their respective global quality scores. The second hypothesis is that an actual quality score of a video can be a mapping of the global quality score of the video according to the context. That is, the actual quality score of the video is assumed to be influenced by the particular context of the video.

The second hypothesis can also mean that the mapping of the video quality assessor does not change the quality order of any two videos. Stated another way, if a first global quality score of a first video is greater than a second global quality score of a second video in one context, then the actual quality score of the first video cannot be worse than the actual quality score of the second video in another context. If a first video and a second video were such that the first video has a better quality score than the second video in one context but a lower quality score in another context (i.e., if the second hypothesis does not hold), then it may not be possible to reliably train the video quality assessor to predict quality scores under such conflicting conditions. As such, under the second hypothesis, the relative order of the quality scores of videos is assumed to remain unchanged regardless of context. Another benefit of the second hypothesis is that video quality scores for respective videos obtained in one context may be used to approximate (based on the ordering) the video quality scores of the videos in another context.

To describe some implementations in greater detail, reference is first made to examples of hardware and software structures used to implement obtaining video quality scores from inconsistent training quality scores. FIG. 1 is an example of an electronic computing and communications system (i.e., a system 100) where obtaining and using video quality scores from inconsistent training quality scores. The system 100 is shown as including a content server device 102, a content provider device 104, and a content viewer device 106. The content server device 102 and the content provider device 104 are communicatively connected to the content server device 102 via a network 108.

Figure 2:
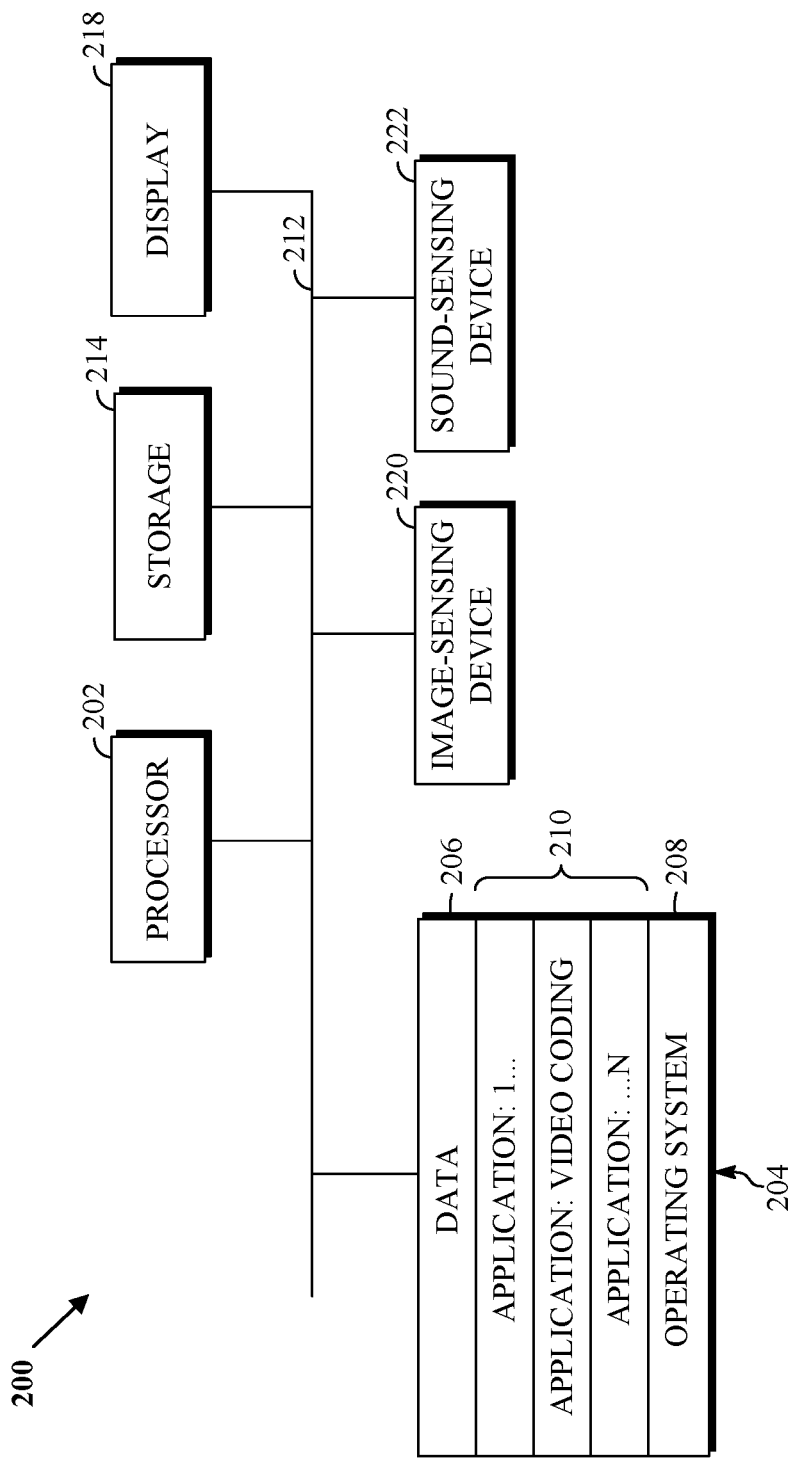
FIG. 2 is a block diagram of an example internal configuration of a computing device of an electronic computing and communications system.

Each of the content server device 102, the content provider device 104, and the content viewer device 106 can be, for example, a computer having an internal configuration of hardware such as that described in FIG. 2. However, other suitable implementations are possible. For example, the processing of the content server device 102 can be distributed among multiple devices. Additionally, while one content provider device 104 and one content viewer device 106 are shown in FIG. 1, many (e.g., tens of thousands) of such devices may be simultaneously connected to (e.g., communicating with) the content server device 102 at any point in time.

The description herein may refer to a device as performing an act. Such should be understood to include that a software (e.g., a software program) running on or available at the device is performing or implements the act. The software program may be executed by one or more computing devices, such as the computing device 200 of FIG. 2. A software program can include machine-readable instructions that may be stored in a memory such as a memory 204 of FIG. 2, and that, when executed by a processor, such as a CPU 202 of FIG. 2, may cause the computing device to perform the instructions of the software program. In some implementations, a device can be implemented as a single physical unit or as a combination of physical units. In some implementations, a single physical unit can include multiple clients.

The content server device 102 may receive video data (referred to as "video" for brevity) from the content provider device 104. The video can be user generated content (UGC), a stream or a recording of an online gaming session, a music video, a video web cast, a television broadcast, or any kind of video data. The content server device 102 may store the received video in a data store 110, which may be or include any suitable device for storing data. The data store 110 may be or include a database that can be used to store media items and data associated therewith, such as respective context-dependent quality scores, as described herein.

The content server device 102 may include a video quality assessor 112 that obtains respective context-dependent quality scores for media items. The video quality assessor 112 may receive an input video and output one or more predicted context-dependent quality scores for the input video. The one or more predicted context-dependent quality scores can be stored in the data store 110 in association with the input video. The video item can be one that is received from the content provider device 104, one that the content server device 102 derives from a video that is received from the content provider device 104, or some other input video.

The content server device 102 may provide (e.g., deliver, stream, or transmit) one or more videos stored in the data store 110, such as in response to a request received from the content viewer device 106. The request may specify a particular video. That is, the request may include an identifier of the particular video. In another example, the content server device 102 may identify (e.g., select) the provided video based on the request. Providing a video to the content viewer device 106 includes providing a variant of the video to the content viewer device 106.

More generally, the content server device 102 can represent any system that allows users to access videos, such as via searching and/or browsing interfaces. The sources of the videos can be or include from user uploads of videos, in addition to the sources described above, searches or crawls of other websites or databases of videos, or the like, or any combination thereof. For example, in one embodiment the content server device 102 can be configured to allow for user uploads of content via the content provider device 104; in another embodiment the content server device 102 can be configured to only obtain videos from other sources by crawling such sources or searching such sources in real time.

As such, the content server device 102 may include tools that enable, facilitate, or implement applications that use the videos stored in the data store 110. At least some of these tools may use context-dependent quality scores. To illustrate, the content server device 102 can use the context-dependent quality scores to determine which media items or which variants thereof to provide responsive to requests.

FIG. 2 is a block diagram of an example internal configuration of a computing device 200 of an electronic computing and communications system. The computing device 200 can be in the form of a computing system including multiple computing devices, or in the form of a single computing device, for example, a mobile phone, a tablet computer, a laptop computer, a notebook computer, a desktop computer, and the like.

The CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

The memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include an application that performs one or more of the techniques described here, such as applications that obtain and/or use video quality scores from inconsistent training quality scores. The computing device 200 can also include a secondary storage 214, which can, for example, be a memory card used with a computing device 200 that is mobile. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
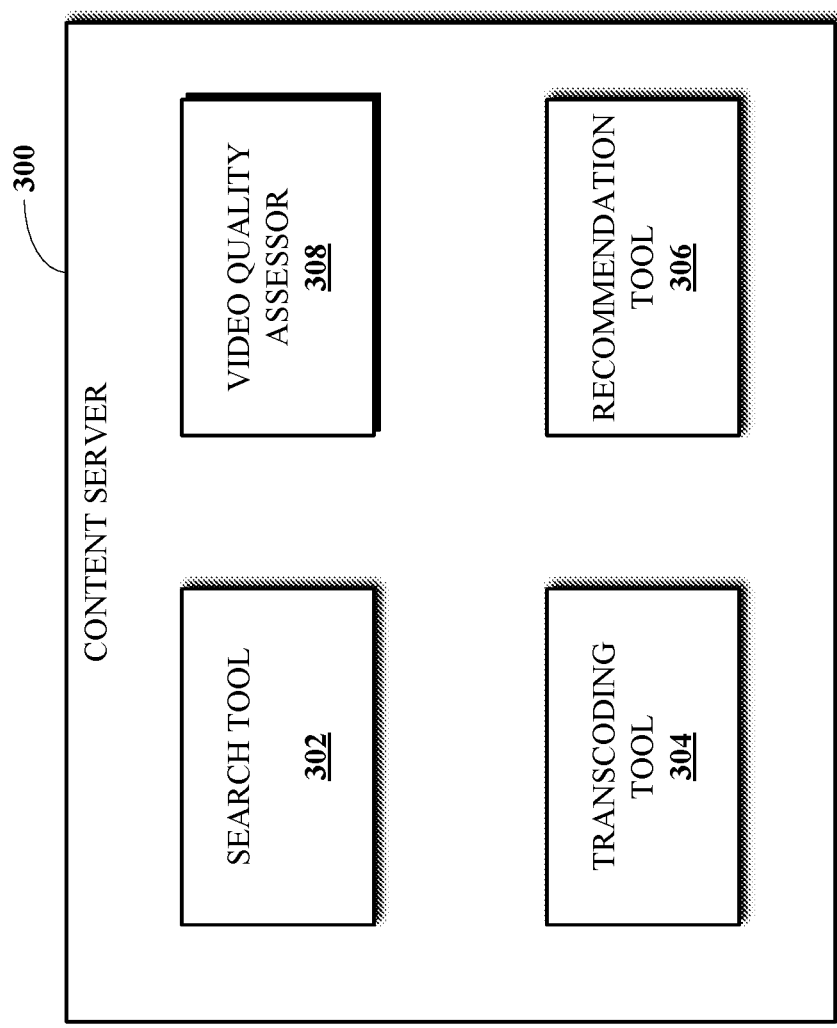
FIG. 3 is a block diagram of example functionality of content server.

FIG. 3 is a block diagram of example functionality of content server 300, which may be or may be included in the content server device 102 of FIG. 1. The content server 300 includes tools, such as programs, subprograms, functions, routines, subroutines, operations, executable instructions, and/or the like that, inter alia and as further described below, can use video quality scores obtained from a video quality assessor 308, which may be the video quality assessor 112 of FIG. 1.

The content server device 300 includes tools that enable, facilitate, or implement applications (via tools) that use the media items. The content server device 102 is shown as including a search tool 302, a transcoding tool 304, and a recommendation tool 306 that can use video quality scores obtained from or derived by another tool, the video quality assessor 308. At least some of the tools of the server device 300 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program The transcoding tool 304 obtains variants for at least some of received media items. As is known, transcoding a media item (i.e., video data) includes encoding the media item using different encoding parameters that are suitable for different viewing contexts. Video compression attempts to identify optimal encoding settings (parameters) to reduce the video bitrate as much as possible while maintaining the perceptual quality of the video. After compression a video to obtain a compressed video, the transcoding tool 304 may input the compressed video to the video quality assessor 308 to obtain video quality score. If the video quality score does not meet a quality threshold, the transcoding tool 304 may re-compress the video using different compression parameters that may result in improved quality score.

The search tool 302 may receive, such as from the content viewer device 106, a request for videos. The request may include search criteria that the software platform 300 may use to identify matching videos in a database, such as the data store 110 of FIG. 1. The search tool 302 may identify several videos in response to the request. The search tool 302 may rank the matching videos at least based on the respective quality scores of the matching scores. In an example, matching scores may already be obtained (by the video quality assessor 308) for the matching scores and stored therewith in the database. In another example, the search tool 302 may input the matching videos to the video quality assessor 308 to obtain respective quality video scores therefor. The search tool 302 may transmit indications of (e.g., identifiers of, hyperlinks to, etc.) the matching videos in response to the request.

The recommendation tool 306 may identify related videos for a user. For example, responsive to a user access of content (e.g., a web page) that may be available through or identifiable to the content server 300, the recommendation tool 306 may identify videos related to the accessed content. In an example, responsive to the user access, the recommendation tool 306 may identify the related videos based on an analysis of a profile of the user. The profile of the user may include a history of previously accessed videos, searched topics, visited geographical locations, or the like, which the user enables the recommendation tool 306 to use to identify the related videos. The recommendation tool 306 may rank the related videos using, at least partially, quality scores obtained for the related videos. The quality scores can be obtained as described with respect to the search tool 302. The recommendation tool 304 may transmit indications of (e.g., identifiers of, hyperlinks to, etc.) the related videos to the user.

Figure 4:
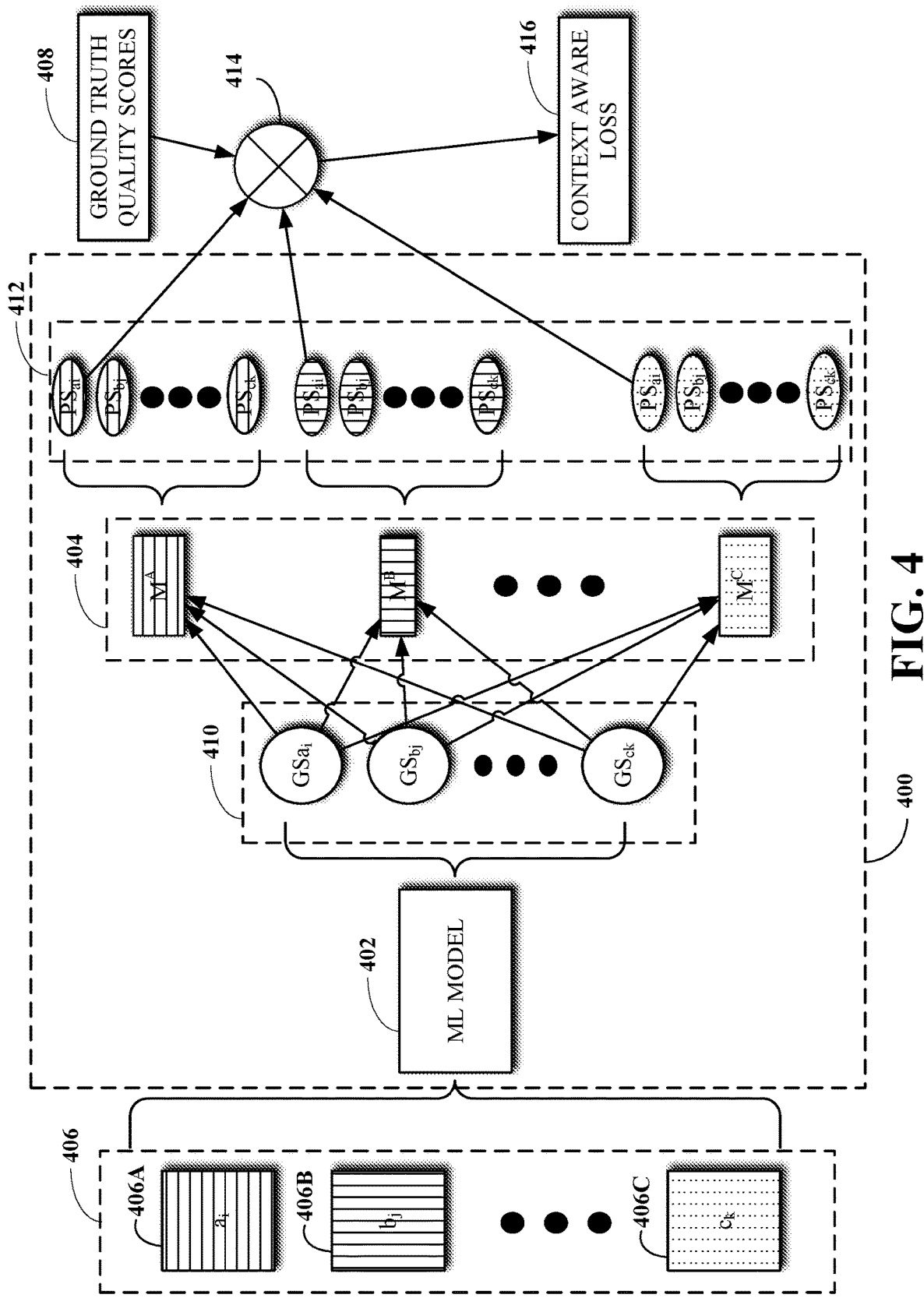
FIG. 4 is a diagram that illustrates a training of a video quality assessor.

FIG. 4 is a diagram that illustrates a training of a video quality assessor 400. The video quality assessor 400 can be the video quality assessor 112 of FIG. 1 or the video quality assessor 308 of FIG. 3. The video quality assessor 400 can be or include a machine learning (ML) model (referred to herein as a video quality predictor) that includes a first ML model 402 and a second ML model 404. The first ML model 402 may be referred to as a global quality score predictor. The second ML model 404 may be referred to a global-to-context quality score mapper. As is known, an ML model undergoes a training phase before it is used in an inference (or production) phase. The training phase is described with respect to FIG. 4.

Given an input video v, the first ML model 402 is trained to obtain (e.g., output, infer, or predict) a global quality score $GS_v$ for the input video. The second ML model 404 is trained to map the global quality score $GS_v$ to context-specific predicted quality scores $PS_v^i$, for i=1 to K, where K is the number of contexts in a training data set 406. That is, given a global quality score $GS_v$ and K number of contexts in the training data set 406, the second ML model 404 can output K context-specific predicted quality scores (i.e., one context-specific predicted quality score for each of the contexts).

During the training phase, the video quality assessor 400 receives the training data set 406 and ground truth quality scores data 408. The training of the video quality assessor 400 is based on the two above-described hypotheses. The training data set 406 may include different subsets of videos that correspond to respective different contexts. FIG. 4 illustrates that the training data set 406 includes three training data subsets, namely training data subsets 406A-406C, each corresponding to a respective context. However, more of fewer subsets corresponding to more of fewer contexts are possible.

Each datum of the training data set 406 and presented to the video quality assessor 400 can be given as a tuple (raw video, context identifier), where raw video may be a location (e.g., a filename) from which the corresponding input can be obtained; and context identifier may be any identifier of the corresponding context. The context identifier can be a meaningful label, a random string, a random number, a descriptive string, or any other identifier of the context. For simplicity of explanation, the context labels used herein are A, B, and C corresponding to the training data subsets 406A-406C, respectively; and a video of a subset X (e.g., A, B, C) is symbolically labeled x (e.g., a, b, c). As such, the training data provided to the video quality assessor 400 can be given by the following set or vector, where m, n, and p correspond to the number of videos in the subsets A, B, and C, respectively.

{$(a_1,A), (a_2,A), \ldots, (a_m,A), (b_1,B), \ldots, (b_n,B), (c_1,C), \ldots, (c_p,C)$}

The ground truth quality scores data 408 includes quality scores for each of the training videos in the training data set 406. For each video of the training data set 406, the ground truth quality scores data 408 includes one quality score s for each of the K contexts of the training data set. As such, the quality scores for a video x can be represented by the vector $(s_x^{C_1}, s_x^{C_2}, \ldots, s_x^{C_K})$, where $C_1, \ldots, C_K$ represent labels of the K contexts. If no valid quality score exists for a position in the vector, then the quality score may be set to an invalid quality score, such as −1. That is, if a ground truth quality score is unavailable for a video x with respect to a context $C_i$, then $s_x^{C_i}=-1$. As such, and assuming that no video of the training data set 406 is used in more than one context, then the ground truth quality scores data 408 can be given by the set or vector:

{$(s_{a_1}^A,-1,-1), (s_{a_2}^A,-1,-1), \ldots, (-1,s_{b_1}^A,-1), \ldots, (-1,-1,s_{c_p}^A)$}

If $GS_{x_i}$ denotes the predicted global quality score for video $x_i$, then the first ML model 402 is trained to output the set of global quality scores {$GS_{a_i}, GS_{b_j}, GS_{c_k}$}, for i=1 ... m, j=1 ... n, and k=1 ... p. The second ML model 404 includes one or more mapping functions M that map a global quality score to K context-specific predicted quality scores. Again, K is the number of contexts in the training data set 406. The mapping function M can be implemented in any number of ways. In an example, the mapping function M can be a deep neural network model. In an example, the mapping function M can be a linear function. In an example the mapping function M may be, as shown in FIG. 4, a piecewise function. The pieces of the piecewise function can each be linear functions. As such, and as shown in FIG. 4, the second ML model 404 includes three trainable linear functions $M^A$, $M^B$, and $M_C$. Each of the linear pieces $M^A$, $M^B$, and $M^C$ of the second ML model 404 can be trained to predict a context-specific quality score from a global quality score. That is, each of the pieces of the piecewise linear function can correspond to a context. Training the piecewise function M can mean or include obtaining respective optimal coefficients for the linear pieces of the piecewise function M.

To restate, the second ML model 404 may include linear functions that are each trained to map a global quality score $GS_{x_i}$ to a predicted context-specific quality score for a particular context. As such, $M^Y(GS_{x_i})(Y=\{A, B, C\})$ denotes the trainable mapping function that coverts the global quality score $GS_{x_i}$ to the predicted context-specific quality scores with respect to the context of dataset Y. As such, given a video x, the second ML model 404 outputs $(PS_x^A, PS_x^B, PS_x^C)=(M^A(GS_x),M^B(GS_x),M^C(GS_x))$ for the contexts shown in FIG. 4.

As such, the predictions (i.e., predicted context-specific quality scores 412) of the videos in the training data set 406 can be given by the vector:

{$(PS_{a_1}^A,PS_{a_1}^B,PS_{a_1}^C), (PS_{a_2}^A,PS_{a_2}^B,PS_{a_2}^C), \ldots, (PS_{c_p}^A, PS_{c_p}^B,PS_{c_p}^C)$}

During the training phase, the video quality assessor 400 can be trained using a context-aware loss function 414. In an example, the context-aware loss function 414 can use the L1 distance to obtain a loss value 416 as given in equation (1). In another example, the L2 distance can be used. Other loss function that use the ground truth quality scores data 408 and the predicted context-specific quality scores 412 are possible.

$$\text{loss}=\Sigma_i \Sigma_{Y=\{A,B,C\}} |s_{x_i}^Y - PS_{x_i}^Y| \quad (1)$$

Equation (1) illustrates that the loss value 416 is calculated as the sum of differences, for each of the videos of the training data set 406 and for each of the contexts, between each predicted context-specific quality score and the corresponding ground truth quality score of the video. As is known, the video quality assessor 400 can be iteratively trained to minimize the loss value 416 between the predicted context-specific quality scores 412 and the ground truth quality scores data 408. The training process can include back-propagating the loss value 416 through the video quality assessor 400.

In an example, if a valid ground truth score is unavailable for a video for a context, then the corresponding predicted context-specific quality score is excluded from the calculation of the loss value 416. That is, if $s_x^{C_i}=-1$ for a certain context $C_i$, then the term $|s_x^{C_i}-PS_x^{C_i}|$ is excluded from the calculation of equation (1).

In an example, constraints can be imposed on the respective coefficients of the linear functions $M^Y$ so that each of the piecewise functions is monotonic. For example, the training process can constrain (i.e., can be configured to constrain) the coefficients of the piecewise function to be non-negative. However, other ways of ensuring that the piecewise functions are monotonic are possible. That is, while non-negative coefficients are sufficient to ensure monotonicity, they are not necessary. Monotonicity of the piecewise functions can preserve the ordering of the video quality scores, as described above with respect to the second hypothesis.

The first ML model 402 can be any ML backbone (e.g., architecture) that can take video data as input and can be trained to output a single global score for the video data. As such, the first ML model 402 can be a convolutional neural network (CNN)-based (such as ResNet, which is short for Residual Network) or a transformer-based (e.g., Vision Transformer (ViT)) ML backbone. To illustrate, in a case that ResNet-50 (a ResNet CNN that is 50 layers deep) is used, each video frame can be input into the model to obtain a per frame global quality score. The per frame scores can be aggregated (such as by average polling) to obtain a single global quality score for the video. In another example, if ResNet-3D (which takes a frame sequence as input), then the ML model can output a single global quality score for the entire video.

In an example, and while not specifically shown in FIG. 4, the video quality assessor 400 can include a third ML model (i.e., a context predictor ML model) that is trained to predict (e.g., infer) a context associated with an input video. The third ML model can be a CNN model that can be trained using the videos of the training data set 406 and the respective context identifiers of the ground truth quality scores data 408. In an example, the third ML model may not be part of the video quality assessor 400; rather the third ML model may be trained separately from the video quality assessor 400.

Figure 5:
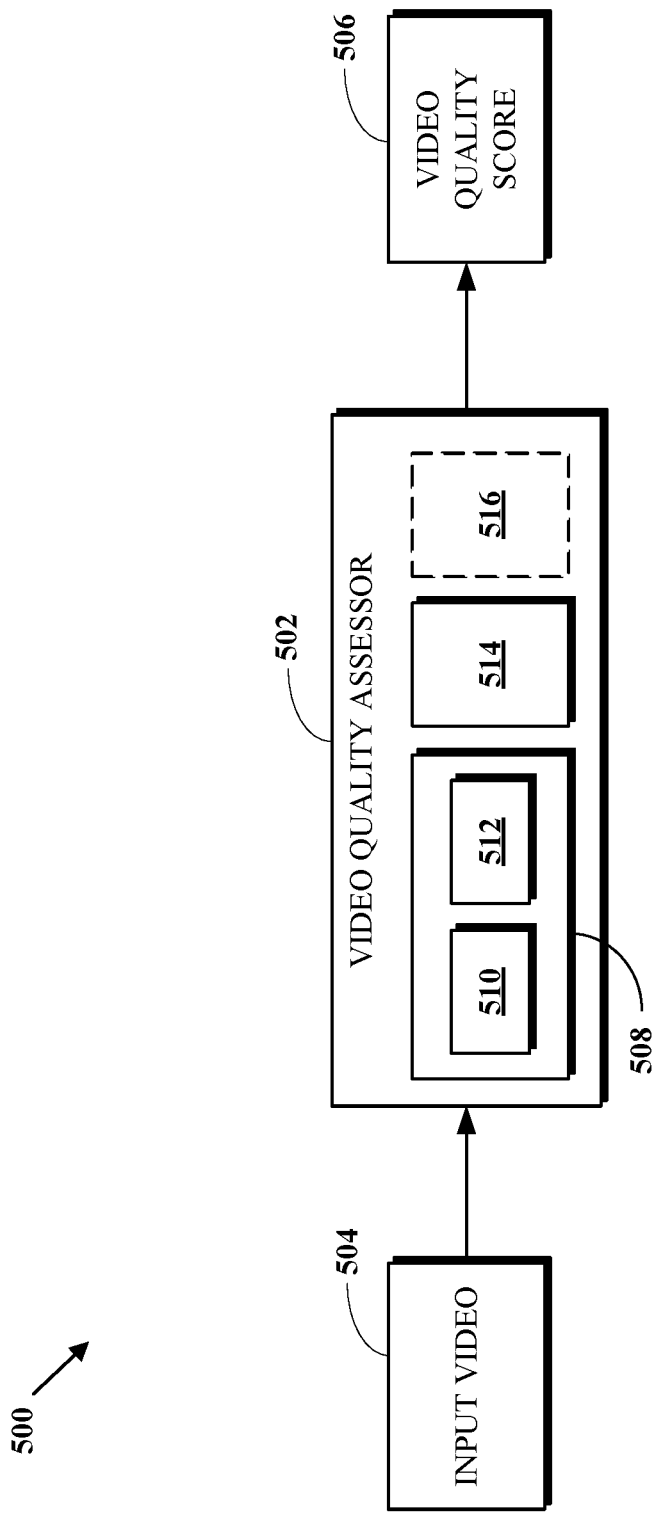
FIG. 5 is a diagram of a workflow for obtaining quality scores from a video quality assessor.

FIG. 5 is a diagram of a workflow 500 for obtaining quality scores from a video quality assessor. A video quality assessor 502 includes an ML model (i.e., a video quality predictor 508) and a quality score selector 514. The video quality assessor 502 may be the video quality assessor 400 of FIG. 4. The video quality predictor 508 may be or include an ML model that has been trained as described with respect to FIG. 4. As such, the video quality predictor 508 may include a first ML model 510, which may be the first ML model 402 of FIG. 4, and a second ML model 512, which may be the second ML model 404 of FIG. 4. The The video quality assessor 500 receives an input video 504. The video quality assessor 502 outputs a video quality score 506 for the input video 504. As mentioned with respect to FIG. 4, the video quality predictor 508 of the video quality assessor 500 may output, for the input video 504, denoted V, a vector of predicted context-specific quality scores ($PS_V^{C_1}$, $PS_V^{C_2}$, ..., $PS_V^{C_K}$), where $C_i$ (i=1, ..., K) are the contexts of the training data set used to train the video quality assessor 502.

The quality score selector 514 selects one of the predicted context-specific quality scores ($PS_V^{C_1}$, $PS_V^{C_2}$, ..., $PS_V^{C_K}$) to output as the video quality score 506. In an example, the quality score selector 514 may output the maximum of the predicted context-specific quality scores. In an example, the quality score selector 514 may output the minimum of the predicted context-specific quality scores. In an example, the quality score selector 514 may output the first (i.e., $PS_V^{C_1}$) of the predicted context-specific quality scores.

In an example, the context of the input video 504 may be known. As such, the quality score selector 514 can output the predicted context-specific quality score of the vector that corresponds to the context. That is, if the context is $C_d$, where 1≤d≤K, then the quality score selector 514 outputs $PS_V^{C_d}$ as the video quality score 506. In an example, and as described above, the video quality assessor 500 may include a context predictor ML model 516. As such, the quality score selector 514 can obtain a prediction of the context of the input video 504. The quality score selector 514 can output the predicted context-specific quality score of the vector that corresponds to the predicted context.

Figure 6:
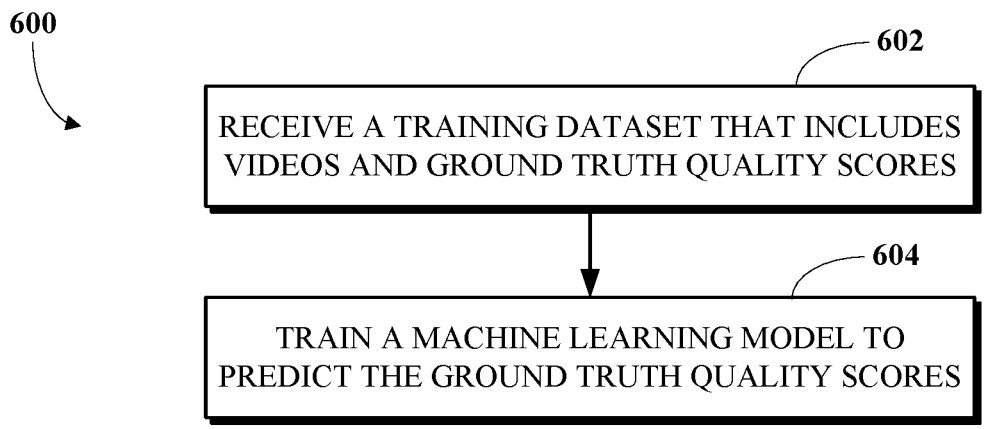
FIG. 6 is an example of a flowchart of a technique for training an ML model to obtain quality scores for input videos.

FIG. 6 is an example of a flowchart of a technique 600 for training an ML model to obtain quality scores for input videos. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

At 602, a training dataset is received. The training dataset can include training videos and corresponding ground truth quality scores. As described with respect to FIG. 4, the training dataset can include multiple subsets. Each of the subsets includes corresponding videos and ground truth quality scores. As such, the training dataset can include a first dataset and a second dataset. The first dataset includes a first subset of first videos corresponding to a first context and respective first ground truth quality scores of the first videos. The second dataset includes a second subset of second videos corresponding to a second context that is different from the first context and respective second ground truth quality scores of the second videos.

At 604, the ML model is trained to predict the ground truth quality scores. As such, the ML model is trained to predict the respective first ground truth quality scores and the respective second ground truth quality scores. Training the ML model can include training the ML model to obtain a global quality score for one of the videos of the training dataset. The ML model is also trained to map the global quality score to context-dependent predicted quality scores. The context-dependent predicted quality scores include a first context-dependent predicted quality score corresponding to the first context and a second context-dependent predicted quality score corresponding to the second context.

As described above, and in an example, the ML model can be trained to map the global quality score to the context-dependent predicted quality scores using piecewise functions. Each piece of the piecewise functions corresponds to a context. In an example, at least one of the piecewise functions is a monotonic function. In an example, at least one of the piecewise functions is a linear function. In an example, all coefficients of the linear function can be constrained during the training to be non-negative values.

In an example, the technique 600 can further include obtaining, for an input video, a plurality of predicted context-specific quality scores from the ML model. One of the plurality of the predicted context-specific quality scores can be output as a predicted quality score for the input video. In an example, the one of the plurality of the predicted context-specific quality scores that is selected can be based on a context of the input video. In an example, the context of the input video can be obtained using a context predictor ML model that is trained to receive input videos and output respective context predictions.

Figure 7:
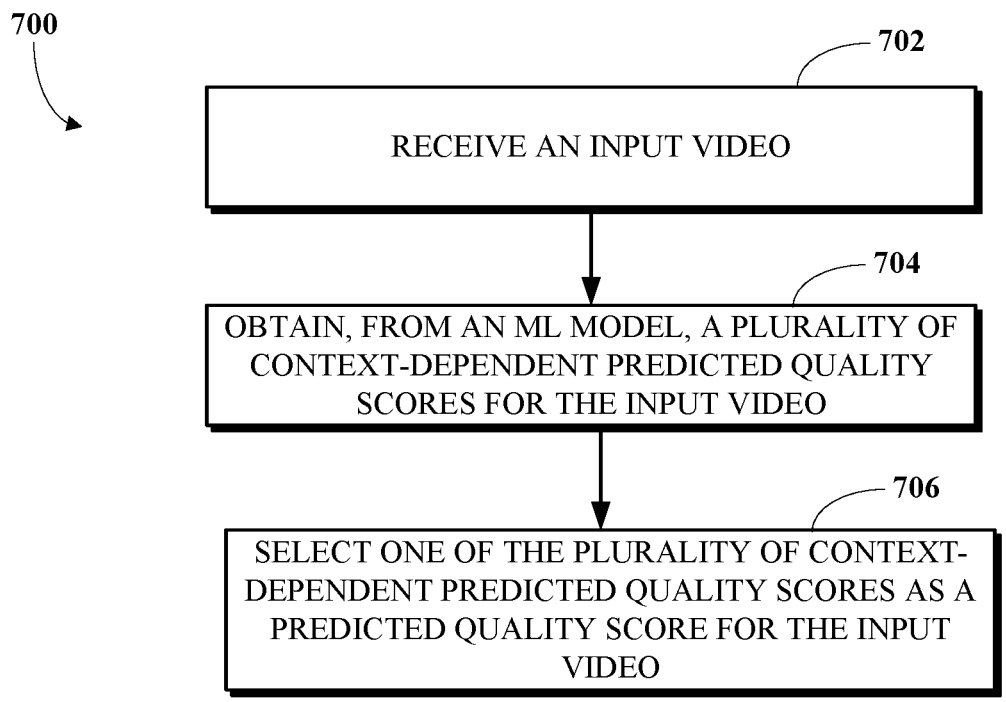
FIG. 7 is an example of a flowchart of a technique for obtaining obtain quality scores for input videos.

FIG. 7 is an example of a flowchart 700 of a technique for obtaining obtain quality scores for input videos. The technique 700 can be executed using computing devices, such as the systems, hardware, and software described with respect to FIGS. 1-5. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof. The technique 700 can be implemented by a video quality assessor, such as the video quality assessor 112 of FIG. 1 or the video quality assessor 502 of FIG. 5. As described above, the video quality assessor includes an ML model that in turn may include a first ML model and a second ML model.

At 702, an input video is received. At 704, a plurality of context-dependent predicted quality scores are obtained for the input video. Obtaining the plurality of context-dependent predicted quality scores includes obtaining a global quality score for the input video and mapping the global quality score to the plurality of context-dependent predicted quality scores. A cardinality (i.e., the number) of the plurality of context-dependent predicted quality scores is equal to a number of subsets of video datasets used to trin the ML model. At 706, one of the plurality of context-dependent predicted quality scores can be selected as a predicted quality score for the input video.

In an example, selecting the one of the plurality of context-dependent predicted quality scores as the predicted quality score for the input video can include selecting the one of the plurality of context-dependent predicted quality scores based on a context of the input video. The context of the input video can be obtained using a context predictor ML model that is trained to receive input videos and output respective context predictions.

In an example, selecting the one of the plurality of context-dependent predicted quality scores as the predicted quality score for the input video can include selecting the one of the plurality of context-dependent predicted quality scores corresponding to a maximum value amongst the plurality of context-dependent predicted quality scores.

In an example, the technique 700 can further include identifying a plurality of videos responsive to a request. Respective quality scores for the plurality of videos can be obtained from the ML model. The plurality of videos can be ranked based on the respective quality scores. In an example, the technique 700 can further include encoding a source video using a first value of an encoding parameter to obtain the input video and determining whether to re-encode the source video using a second value of the encoding parameter that is different from the first value based on the predicted quality score. The encoding parameter may be a bit allocation value, a quantization parameter value, or some other encoding parameter that affects the quality of an encoded video.

The video quality assessor is described above as including a global quality score predictor and an optional context predictor. Each of these models can be any type of ML model that is capable of being trained, as described herein. In an example, each of these models can be a neural network. In an example, the neural network can be a deep-learning convolutional ML model (CNN). In a CNN, a feature extraction portion typically includes a set of convolutional operations, which is typically a series of filters that are used to filter an input (e.g., an image) based on a filter. For example, these filters can be used to find features in an input image (e.g., a frame of video). The features can include, for example, edges, corners, endpoints, and so on. As the number of stacked convolutional operations increases, later convolutional operations can find higher-level features. A classification portion of the CNN is typically a set of fully connected layers. The fully connected layers can be thought of as looking at all the input features of an image in order to generate a high-level classifier. Several stages (e.g., a series) of high-level classifiers eventually generate the desired classification output.

As mentioned, a typical CNN network is composed of a number of convolutional operations (e.g., the feature-extraction portion) followed by a number of fully connected layers. The number of operations of each type and their respective sizes is typically determined during a training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

A convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. A convolution layer can use (e.g., create, construct, etc.) a convolution filter that is convolved with the layer input to produce an output (e.g., a tensor of outputs). A Dropout layer can be used to prevent overfitting by randomly setting a fraction of the input units to zero at each update during a training phase. A Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The activation function may be a linear function or non-linear function (e.g., a sigmoid function, an arcTan function, a tanH function, a ReLu function, or the like).

Each of the fully connected operations is a linear operation in which every input is connected to every output by a weight. As such, a fully connected layer with N number of inputs and M outputs can have a total of NxM weights. As mentioned above, a Dense operation may be generally followed by a non-linear activation function to generate an output of that layer.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of content server device 102 (and the techniques, algorithms, methods, instructions, etc., stored thereon and/or executed thereby, including the techniques 600 and 700 of FIGS. 6 and 7, respectively) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one aspect, for example, the content server device 102 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
receiving a training dataset,
   wherein the training dataset comprises a first dataset and a second dataset,
   wherein the first dataset comprises a first subset of first videos corresponding to a first context and respective first ground truth quality scores of the first videos, and
   wherein the second dataset comprises a second subset of second videos corresponding to a second context that is different from the first context and respective second ground truth quality scores of the second videos; and
training a machine learning model to predict the respective first ground truth quality scores and the respective second ground truth quality scores, wherein training the machine learning model comprises:
   training the machine learning model to obtain a global quality score for one of the videos of the training dataset, wherein the global quality score is context independent; and
   training the machine learning model to map the global quality score to context-dependent predicted quality scores, wherein the context-dependent predicted quality scores comprising a first context-dependent predicted quality score corresponding to the first context and a second context-dependent predicted quality score corresponding to the second context.

2. The method of claim 1, wherein the machine learning model is trained to map the global quality score to the context-dependent predicted quality scores using piecewise functions, wherein each piece of the piecewise functions corresponds to a context.

3. The method of claim 2, wherein at least one of the piecewise functions is a monotonic function.

4. The method of claim 2, wherein the at least one of the piecewise functions is a linear function.

5. The method of claim 4, wherein all coefficients of the linear function are constrained during the training to be non-negative values.

6. The method of claim 1, further comprising:
obtaining, for an input video, a plurality of predicted context-specific quality scores from the machine learning model; and
selecting one of the plurality of the predicted context-specific quality scores as a predicted quality score for the input video.

7. The method of claim 6, wherein selecting the one of the plurality of the predicted context-specific quality scores as the predicted quality score for the input video comprises:
selecting the one of the plurality of the predicted context-specific quality scores based on a context of the input video.

8. The method of claim 7, wherein the context of the input video is obtained using a context predictor machine learning model that is trained to receive input videos and output respective context predictions.

9. A device, comprising:
a processor that is configured to:
   receive an input video;
   obtain, from a machine learning model, a plurality of context-dependent predicted quality scores for the input video, wherein to obtain the plurality of context-dependent predicted quality scores comprises to:
      obtain a global quality score for the input video, wherein the global quality score is context independent; and
      map the global quality score to the plurality of context-dependent predicted quality scores; and
   select one of the plurality of context-dependent predicted quality scores as a predicted quality score for the input video.

10. The device of claim 9, wherein to select the one of the plurality of context-dependent predicted quality scores as the predicted quality score for the input video comprises to:
select the one of the plurality of context-dependent predicted quality scores based on a context of the input video.

11. The device of claim 10, wherein the context of the input video is obtained using a context predictor machine learning model that is trained to receive input videos and output respective context predictions.

12. The device of claim 9, wherein to select the one of the plurality of context-dependent predicted quality scores as the predicted quality score for the input video comprises to:
select the one of the plurality of context-dependent predicted quality scores corresponding to a maximum value amongst the plurality of context-dependent predicted quality scores.

13. The device of claim 9, wherein the processor is further configured to:
identify a plurality of videos responsive to a request;
obtain, from the machine learning model, respective quality scores for the plurality of videos; and
rank the plurality of videos based on the respective quality scores.

14. The device of claim 9, wherein the processor is further configured to:
encode a source video using a first value of an encoding parameter to obtain the input video; and
determine whether to re-encode the source video using a second value of the encoding parameter that is different from the first value based on the predicted quality score.

15. A non-transitory computer readable medium storing instructions operable to cause one or more processors to perform operations comprising:
receiving an input video;
obtaining, from a machine learning model, a plurality of context-dependent predicted quality scores for the input video, wherein obtaining the plurality of context-dependent predicted quality scores comprises:
   obtaining a global quality score for the input video, wherein the global quality score is context independent; and mapping the global quality score to the plurality of context-dependent predicted quality scores; and selecting one of the plurality of context-dependent predicted quality scores as a predicted quality score for the input video.

16. The non-transitory computer readable medium of claim 15, wherein selecting the one of the plurality of context-dependent predicted quality scores as the predicted quality score for the input video comprises:

selecting the one of the plurality of context-dependent predicted quality scores based on a context of the input video.

17. The non-transitory computer readable medium of claim 16, wherein the context of the input video is obtained using a context predictor machine learning model that is trained to receive input videos and output respective context predictions.

18. The non-transitory computer readable medium of claim 15, wherein selecting the one of the plurality of context-dependent predicted quality scores as the predicted quality score for the input video comprises:

selecting the one of the plurality of context-dependent predicted quality scores corresponding to a maximum value amongst the plurality of context-dependent predicted quality scores.

19. The non-transitory computer readable medium of claim 15, wherein the operations further comprise:

identifying a plurality of videos responsive to a request;

obtaining, from the machine learning model, respective quality scores for the plurality of videos; and ranking the plurality of videos based on the respective quality scores.

20. The non-transitory computer readable medium of claim 15, wherein the operations further comprise:

encoding a source video using a first value of an encoding parameter to obtain the input video; and determining whether to re-encode the source video using a second value of the encoding parameter that is different from the first value based on the predicted quality score.

* * * * *